Figure 2:
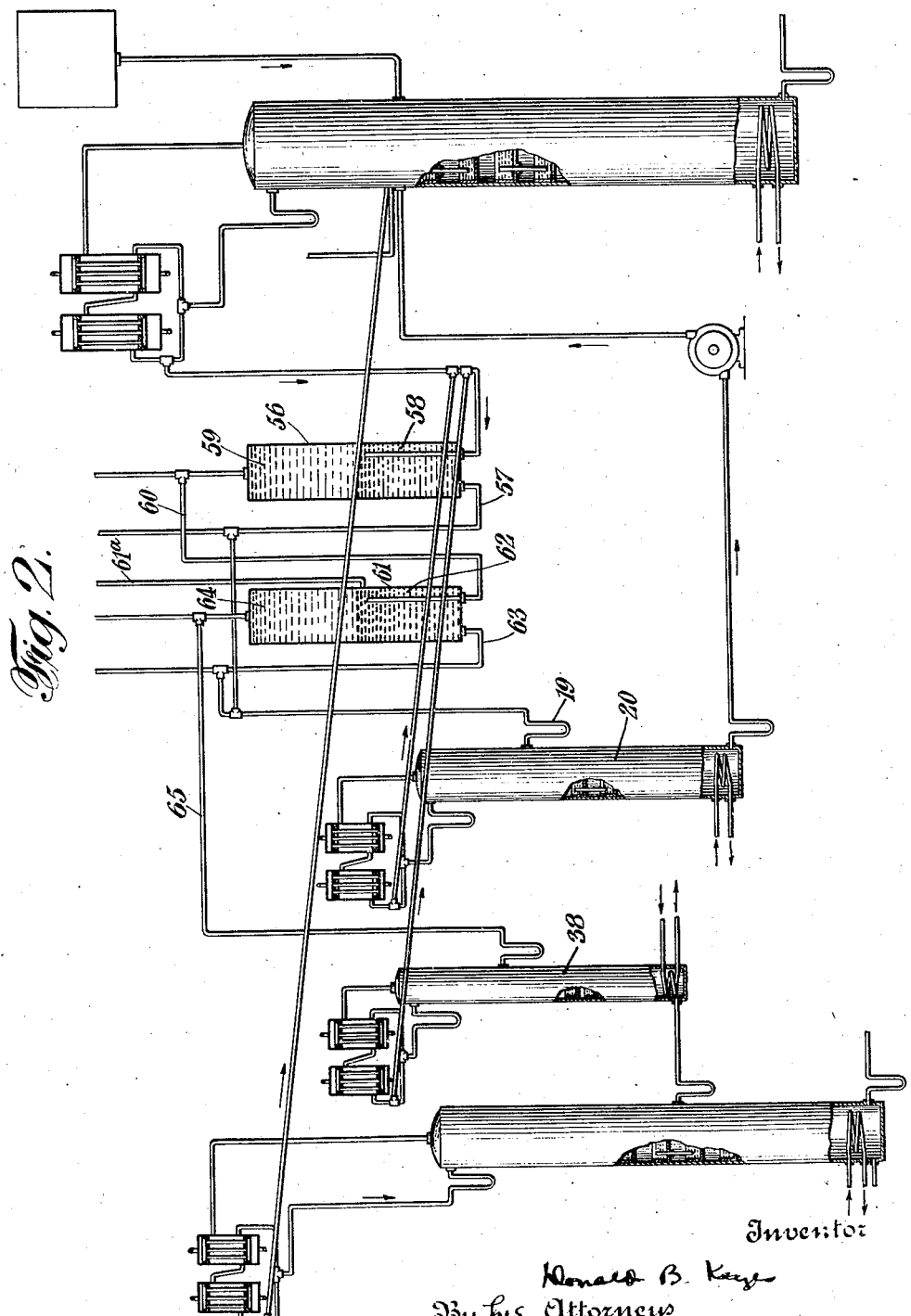

Nov. 3, 1931.  D. B. KEYES  1,830,469
ABSOLUTE ALCOHOL PROCESS
Filed March 30, 1926    2 Sheets-Sheet 1

Patented Nov. 3, 1931

1,830,469

UNITED STATES PATENT OFFICE

DONALD B. KEYES, OF BALTIMORE, MARYLAND, ASSIGNOR TO U. S. INDUSTRIAL ALCOHOL CO., A CORPORATION OF WEST VIRGINIA

ABSOLUTE ALCOHOL PROCESS

Application filed March 30, 1926. Serial No. 98,433.

My invention relates particularly to a process for producing absolute alcohol with the aid of a third constituent, which will produce a ternary constant boiling mixture with the alcohol and water present so as to remove the water from the alcohol.

The object of my invention is to provide a process of this kind which is adapted for the use of various different materials as the third constituent while still obtaining efficiency in the operation of the process. This is accomplished particularly by reason of the fact that in my process I preferably distill separately the two liquid layers obtained in the distillate produced by the dehydrating column after having washed the water layer in a scrubber. For example, this enables me to effectively use ethyl acetate as the third constituent when desired, although it is to be understood, of course, that my invention contemplates the use of any one of a number of different materials for this purpose. Furthermore, the efficency of the process is increased due to the fact that in my process the pure third constituent, as, for example, benzol, ethyl acetate, carbon tetrachloride, or hexane, is returned to the dehydrating column. Also, inasmuch as I remove all of the third constituent from the alcohol before supplying the same to the alcohol recovery column, the capacity of the apparatus is increased thereby. Further objects of my invention will appear from the detailed description of the same hereinafter.

While my invention is capable of embodiment in many different forms, and is capable of being used in connection with many different types of apparatus, by way of illustration I have shown only certain forms of the same in the accompanying drawings, in which—

Figure 1 is a diagrammatic representation of an apparatus which may be used in accordance with my invention when using one class of liquids as the third constituent, and Figure 2 is a diagrammatic representation of a modified form of the same when using another class of the liquids for said third constituent.

For example, in carrying out my invention, in the case where benzol is used as the third constituent, I may provide a dehydrating column 1 made up of any desired number of plates and adapted to be heated by indirect heat from steam supplied through a pipe 2 at the bottom thereof and which passes out by means of a pipe 3. Alcohol containing water, as, for example, having a strength of 95%, is fed from a tank 4 to the column 1, and preferably, though not necessarily, to the 10th plate of the same from the top in a column having 40 plates, the tank 4 being connected to the column 1 by means of a pipe 5. The column 1 is, furthermore, previously supplied with a quantity of the third constituent, such, for example, as benzol, which will form a constant boiling mixture to carry off the water contained in the alcohol, thus leaving absolute alcohol in the column 1 which is drawn off through a trapped pipe 6. The initial supply of the benzol may be supplied to the apparatus by means of a pipe 7 which enters the column 1 on the same plate as the alcohol feed which is supplied by the pipe 5. The quantity of benzol added initially remains in the circulating system substantially entirely but in case there is any substantial decrease in the original amount, this may be replaced by adding further quantities through the pipe 7. The amount of benzol fed to the system is determined as follows: In the initial filling of the dehydration column about equal amounts of benzol and 95% strength alcohol are introduced into the same, and further amounts of benzol are introduced from time to time to replace possible losses of the same, as desired. As a result of the distillation in the column 1 a ternary constant boiling mixture containing alcohol, benzol and water, will be evolved in the form of vapors and passed off from the top of the same through a vapor outlet pipe 8, the temperature at the top of the column 1 being substantially 65° C. during the distillation, and at the bottom of the column 79° C. The composition of the constant boiling mixture thus evolved will vary somewhat according to the conditions of operation but may be, for example, comprised of 74.1 parts by weight of benzol, 7.4 parts by weight of water, and 18.5 parts by weight of alcohol. These vapors are conducted to a dephlegmator 9 having a current of cooling water supplied with the aid of an inlet pipe 10 and an outlet pipe 11, the condensate therein being returned by a trapped pipe 12 to the top of the dehydrating column 1 while the remaining uncondensed vapors pass into a similarly constructed and operated condenser 13 by means of a pipe 14 in which the vapors have a temperature of approximately 65° C. The condensate passes out of the same by means of a pipe 15, part of the same being returned by a branch pipe 16 to the pipe 12 and thence to the top of the dehydrating column 1. The main portion of the condensate passes from the pipe 15 into a separating chamber 16a where the condensate becomes divided into two layers, the approximate composition of which at 28° C. is as follows:

| | | |
|---|---|---|
| Temp. °C. | | 28 |
| % wt. upper layer | Alcohol | 11.6 |
| | Benzol | 85.6 |
| | Water | 2.8 |
| % wt. lower layer | Alcohol | 51.3 |
| | Benzol | 8.1 |
| | Water | 40.6 |
| % weight upper layer | | 84.7 |
| % weight lower layer | | 15.3 |

The benzol layer 17 passes out of the separating chamber 16a by an over-flow vented trapped pipe 19 in the form of a liquid to a column 20 heated indirectly by means of steam passing into the base of the same through an inlet pipe 21 and out through an outlet pipe 22. Approximately the ternary constant boiling mixture is evolved from the top of the column 20 through a pipe 23 which conveys the same to a dephlegmator 24 and a condenser 25 constructed in the same manner as the dephlegmator 9 and the condenser 13 whence a part of the condensate passes to the column 20 through a pipe 26 and the remainder of the condensate is conveyed by a pipe 27 back to the pipe 15 so as to again pass through the separating chamber 16a. From the bottom of the column 20 there is obtained substantially pure benzol which passes through a trapped pipe 28 to a pump 29 and thence back to the feed plate of the dehydrating column 1 by means of a pipe 30. The water layer 18 from the separating chamber 16a which still contains some benzol, is conveyed to a scrubbing chamber 31 by a vented pipe 32. Water is supplied to the scrubbing chamber 31 by a pipe 33 in an amount sufficient to cause a separation into two liquid layers 34 and 35. The benzol layer 34 thus obtained passes out of the scrubber 31 by a vented pipe 36 to the pipe 19 and thence into the benzol column 20 so as to abstract the benzol therefrom and return the same through the pipes 28 and 30 to the feed plate of the dehydrating column 1. The remaining water layer 35 is then conveyed from the scrubbing chamber 31 by a vented trapped pipe 37 to an alcohol rectifying column 38 heated indirectly by steam supplied by a pipe 39 and passing out by a pipe 40. From this column 38, also, there is evolved approximately the ternary constant boiling mixture, vapors of which pass out of the same by a pipe 41 to a dephlegmator 42 and a condenser 43 constructed in the same and a condenser 43 constructed in the same manner as the dephlegmator and condenser 9 and 13 respectively, part of the condensate from the same returning by a trapped pipe 44 to the top of the column 38 and the remainder of the condensate being returned by a pipe 45 to the pipe 15 and thence into the separating chamber 16a. From the bottom of the column 38 there is secured alcohol having an increased strength, that is to say, a strength of approximately 30%, which passes out of the same by a trapped pipe 46 to the side of an alcohol recovery column 47 provided with indirect heating by means of steam supplied by a pipe 48, and passing out through a pipe 49. This column may also be heated by a direct steam pipe 49a, if desired. The temperature thus maintained at the top of the column 47 is approximately 78° C. In this way vapors of alcohol having a strength of 95%, are evolved and pass through a pipe 50 and are conveyed thence to a dephlegmator 51 and a condenser 52 constructed in the same manner as the dephlegmator and condenser 9 and 13 respectively, and connected by a pipe 51a in which the temperature is approximately 78° C., part of the condensate being returned by a pipe 53 to the top of the column 47 and the remainder, comprised of liquid alcohol of 95% strength being conducted by a pipe 54 to the feed plate of the dehydrating column 1. From the bottom of the column 47, which is preferably maintained at a temperature just above 100° C., the residual water is conducted away by a trapped pipe 55.

It will be understood, however, if desired, that the condenser 52 may be eliminated so as to convey the alcohol back to the column 1 in the form of a vapor but in that event it would be conveyed to the column 1 at a somewhat lower point therein.

It will also be understood that according to the particular material used as the third constituent, the temperatures, proportions, etc., will be appropriately varied to accord with the same.

It will be understood of course, also, if desired, that instead of feeding the alcohol and other liquid into the column 1 by separate pipes, they may be mixed together outside of the column by conveying them to the column 1 by the same pipe. Furthermore, it will be understood that, if desired, any additional purification of the absolute alcohol obtained from the pipe 6 to remove solids or high boiling impurities, may be carried out by further rectification or otherwise, as desired.

The above description of my process, in connection with Figure 1, applies also when using ethyl acetate or hexane as the third liquid. In the case where carbon tetrachloride is used, however, owing to the fact that the liquid layers in the separating and scrubbing chambers would be reversed due to the density of the carbon tetrachloride, a somewhat different arrangement of the connection would be needed, as shown in Figure 2. The said Figure 2 shows an arrangement the same as given in Figure 1 except in the following respects: In this instance a separating chamber 56 is provided having a draw-off pipe 57 from the bottom to convey the carbon tetrachloride layer 58 therefrom to the pipe 19 and thence to the column 20, while the upper water layer 59 is conveyed out of the separating chamber 56 by means of a vented pipe 60 to a scrubbing chamber 61 supplied with water by a pipe 61a. Here, again, a lower carbon tetrachloride layer 62 is formed, which is conveyed away by a vented pipe 63 to the pipe 19, and an upper water layer 64 is formed, which is conducted by a vented pipe 65 to the column 38. It will of course be understood that the percentage compositions of these layers in the separating and scrubbing chambers will be somewhat different than the percentage compositions when using benzol. Also, the temperatures prevailing in the different columns will be changed to accord with the different boiling points due to the presence of carbon tetrachloride instead of benzol. The course of flow of the liquids and vapors in this modified form of my apparatus will be the same as in the case of the apparatus shown in Figure 1 except in the respects mentioned, due to the reversal of the layers in the separating and scrubbing chambers, as above described.

By means of this process, therefore, I am able to obtain absolute alcohol continuously from a continuous feed of an alcohol of a lower strength, and by using any one of the various third constituents as above referred to, and while still carrying out the process in a practical and efficient manner with a high capacity of production.

While I have described my invention above in detail I wish it to be understood that many changes may be made therein without departing from the spirit of the same.

I claim:

1. The process which comprises distilling a composition containing alcohol, water and a third constituent forming a minimum constant boiling mixture therewith adapted to form a condensate spontaneously separating into layers, and thus dehydrating the composition by means of a distillation operation to which the alcohol containing water is fed, allowing the condensate to separate into liquid layers, scrubbing the layer containing the larger percentage of water with water so as to form two liquid layers, separately rectifying by distillation the layer containing the main percentage of the third constituent so as to obtain the third constituent therefrom in substantially pure form and returning the pure third constituent thus obtained as a residue in the rectification to the point at which the alcohol is fed in the dehydrating operation.

2. The process which comprises distilling a composition containing alcohol, water and benzol to form a minimum constant boiling mixture therewith and thus dehydrating the composition by means of a distillation operation to which the alcohol containing water is fed, allowing the condensate to separate into liquid layers, scrubbing the layer containing the larger percentage of water with water so as to form two liquid layers, separately rectifying by distillation the layer containing the main percentage of benzol so as to obtain the benzol in substantially pure form and returning the pure benzol thus obtained as a residue in the rectification in the point at which the alcohol is fed to the dehydrating operation.

3. The process which comprises distilling a composition containing alcohol, water and a third constituent forming a minimum constant boiling mixture therewith adapted to form a condensate spontaneously separating into layers, and thus dehydrating the composition by means of a distillation operation to which the alcohol containing water is fed, allowing the condensate to separate into liquid layers, scrubbing the layer containing the larger percentage of water with water so as to form two liquid layers, separately rectifying by distillation other than in said dehydrating operation the layer containing the main percentage of the third constituent so as to obtain the third constituent therefrom and returning the ternary constant boiling mixture from the rectification to the point of the first mentioned separation of liquid layers.

4. The process which comprises distilling a composition containing alcohol, water and benzol to form a minimum constant boiling mixture therewith and thus dehydrating the composition by means of a distillation operation to which the alcohol containing water is fed, allowing the condensate to separate into liquid layers, scrubbing the layer containing the larger percentage of water with water so as to form two liquid layers, separately rectifying by distillation other than in said dehydrating operation the layer containing the main percentage of the benzol so as to obtain the benzol therefrom and returning the ternary constant boiling mixture from the rectification to the point of the first mentioned separation of liquid layers.

5. The process which comprises distilling a composition containing alcohol, water and a third constituent forming a minimum constant boiling mixture therewith and thus dehydrating the composition in an operation to which the alcohol containing water is fed, allowing the condensate to separate into liquid layers, scrubbing the layer containing the larger percentage of water thus obtained with water so as to form liquid layers, and rectifying the materials contained in the liquid layer formed in the separation and scrubbing operations, containing the higher percentage of the third constituent by distillation other than in said dehydrating operation so as to obtain a ternary constant boiling mixture which is returned to the point of the above mentioned separation of liquid layers.

6. The process which comprises distilling a composition containing alcohol, water and benzol to form a minimum constant boiling mixture therewith and thus dehydrating the composition by means of a distillation operation to which the alcohol containing water is fed, allowing the condensate to separate into liquid layers, scrubbing the layer containing the larger percentage of water thus obtained with water so as to form liquid layers, and rectifying the materials contained in the liquid layer formed in the separation and scrubbing operations, containing the higher percentage of the third constituent by distillation other than in said dehydrating operation so as to obtain a ternary constant boiling mixture which is returned to the point of the above mentioned separation of liquid layers.

7. The process which comprises distilling a composition containing alcohol, water and a third constituent forming a minimum constant boiling mixture therewith adapted to form a condensate spontaneously separating into layers and thus dehydrating the composition by means of a distillation operation to which the alcohol containing water is fed, allowing the condensate to separate into liquid layers, scrubbing the layer containing the larger percentage of water thus obtained with water so as to form liquid layers, rectifying the materials contained in the liquid layer formed in the separation and scrubbing operations containing the higher percentage of the third constituent, obtaining as a residue of the rectification aqueous alcohol freed from the third constituent and then conveying the said aqueous alcohol directly to an alcohol recovery operation so as to obtain 95% strength alcohol and then returning the 95% strength alcohol to the dehydrating operations.

8. The process which comprises distilling a composition containing alcohol, water and benzol to form a minimum constant boiling mixture therewith and thus dehydrating the composition by means of a distillation operation to which the alcohol containing water is fed, allowing the condensate to separate into liquid layers, scrubbing the layer containing the larger percentage of water thus obtained with water so as to form liquid layers, rectifying the materials contained in the liquid layer formed in the separation and scrubbing operation containing the higher percentage of the third constituent, obtaining as a residue of said rectification aqueous alcohol freed from the benzol and then conveying the said aqueous alcohol directly to an alcohol recovery operation so as to obtain 95% strength alcohol and then returning the 95% strength alcohol to the dehydrating operation.

9. The process which comprises distilling a composition containing alcohol, water and benzol to form a minimum constant boiling mixture therewith and thus dehydrating the mixture therewith by means of a distillation operation to which the alcohol containing water is fed, allowing the condensate to separate into liquid layers, rectifying the materials contained in the layer containing the larger percentage of water by distillation other than in said dehydration operation, returning the distillate therefrom to the dehydration operation, distilling the layer containing the larger percentage of benzol by distillation other than in said dehydration operation and returning the distillate therefrom to the point of the first mentioned separation of liquid layers.

10. The process which comprises distilling a composition containing alcohol, water and benzol to form a minimum constant boiling mixture therewith and thus dehydrating the composition by means of a distillation operation to which the alcohol containing water is fed, allowing the condensate to separate into liquid layers, rectifying the materials contained in the layer containing the larger percentage of water by distillation other than in said dehydration operation, returning the distillate therefrom to the dehydration operation, distilling the layer containing the larger percentage of benzol by distillation other than in said dehydration operation, returning the distillate therefrom to the point of the first mentioned separation of liquid layers and returning the residual benzol to the dehydration operation.

In testimony that I claim the foregoing, I have hereunto set my hand this 16 day of March, 1926.

DONALD B. KEYES.